July 30, 1963  C. J. DAVIS  3,099,098
CRAWLER TRENCHER WITH TILTABLE BODY
Filed Nov. 20, 1961  4 Sheets-Sheet 1

CHARLES J. DAVIS
*INVENTOR.*
BY *Hubert Miller*

July 30, 1963  C. J. DAVIS  3,099,098
CRAWLER TRENCHER WITH TILTABLE BODY
Filed Nov. 20, 1961  4 Sheets-Sheet 2

CHARLES J. DAVIS
INVENTOR.

BY Hubert Miller

July 30, 1963  C. J. DAVIS  3,099,098
CRAWLER TRENCHER WITH TILTABLE BODY
Filed Nov. 20, 1961  4 Sheets-Sheet 3

CHARLES J. DAVIS
INVENTOR.

BY Hubert Miller

United States Patent Office 3,099,098
Patented July 30, 1963

3,099,098
CRAWLER TRENCHER WITH TILTABLE BODY
Charles J. Davis, 22 Colonial, Wichita, Kans.
Filed Nov. 20, 1961, Ser. No. 153,410
6 Claims. (Cl. 37—86)

This invention relates generally to self propelled type vehicles which carry power operated ground implements, and more particularly to a track laying vehicle of that type which is so constructed that the ground working implement may be maintained in a vertical plane while the vehicle is on the side of a hill, the wheel tracks on one side of the vehicle being consequently disposed at a lower level than the wheel tracks on the other side.

It is recognized that this general result has previously been accomplished on various constructions, such as individually tiltable front and rear axles, individual wheel units mounted on elongatable hydraulic cylinders, suspension of body from individual wheel units by individual torque bar assemblies, etc.

The disadvantage with such constructions in the past has been the difficulty of transmitting power from a power plant supported in fixed position on the vehicle body to drive wheels rotating on axes which change position with respect to the body, coupled with the further difficulty of providing, at the same time, a stable support for a ground working implement which transmits forces to the implement supporting portion of the vehicle along several different directional lines.

My invention provides a solution to the above mentioned difficulty by providing a rigid crawler undercarriage or chassis which is unyieldingly supported between the wheel tracks carried at the opposite sides of the crawler chassis, a rigid platform or body mounted on the chassis along a longitudinally disposed axis so that it may be tilted laterally with respect to the chassis, the power plant and ground working implement being anchored in a fixed position on the body and tiltable therewith, and a means for transmitting power from the power plant to the wheel tracks, the power transmitting means being indifferent to body movement or position with respect to the rigid chassis.

The crawler chassis in the present vehicle thus serves as a very stable platform to take the reaction of forces transmitted through the body from the ground working implements. The wheel tracks provided at either side of this chassis afford an extended ground contact area irrespective of whether the terrain is even or uneven. Tractive effort because of such solid contact is therefore high and is of a particular advantage in a ground trenching operation for example where steady movement of the vehicle must be maintained despite high reactive forces exerted against the trenching implement.

It is therefore a primary object of my invention to provide a crawler type vehicle which carries power driven ground engaging implements in a manner that they readily assume the assigned attitude of entry into the ground, and which sustains solid ground contact at all times without disturbing the attitude of the implements as the vehicle progresses therewith along the terrain. A specific object in line with the just stated object is to provide a crawler trencher having a body which tilts with respect to a longitudinally extending central axis and which supports a trencher on the body that is maintained thereby in a fore and aft disposed vertical digging plane while the crawler trencher is travelling along the side of a hill. Other objects and advantages of the invention will be apparent when the following description is read in connection with the accompanying drawings which form a part hereof and in which:

Figure 1:
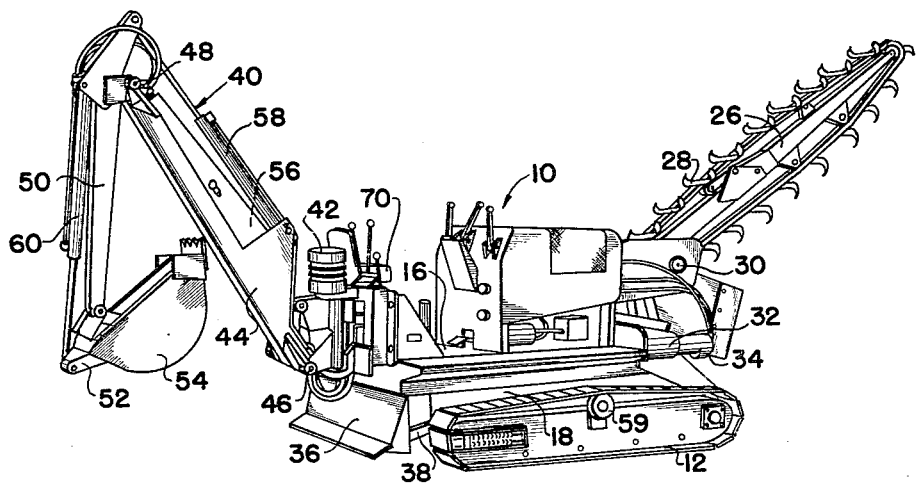
FIG. 1 is an isometric view of a vehicle embodying the present invention.
Figure 2:
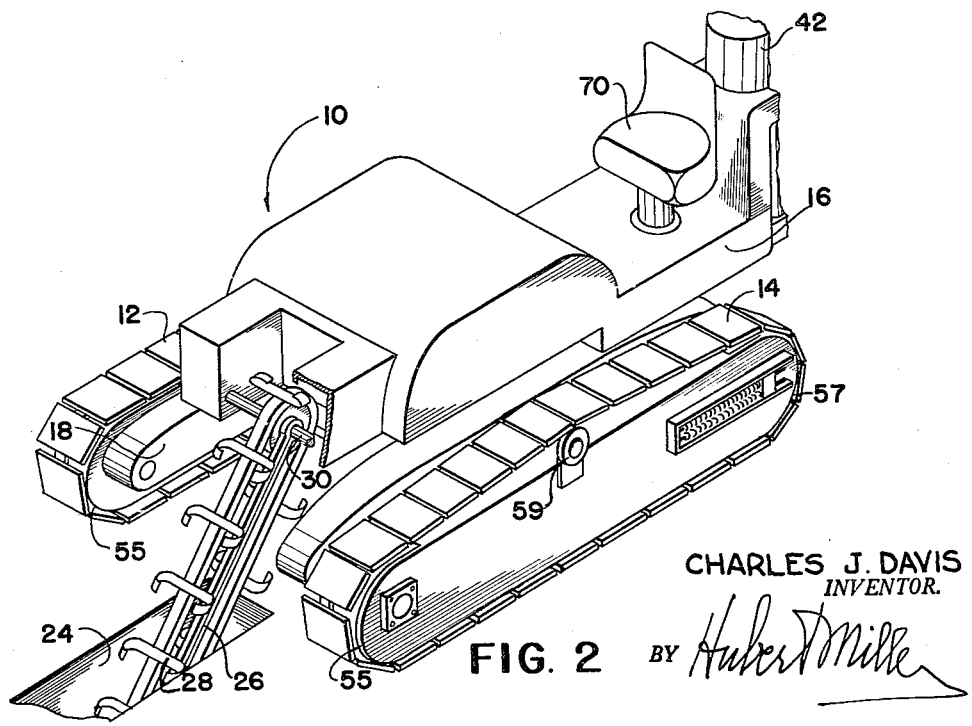
FIG. 2 is an isometric view showing the vehicle proceeding in a trenching operation.
Figure 3:
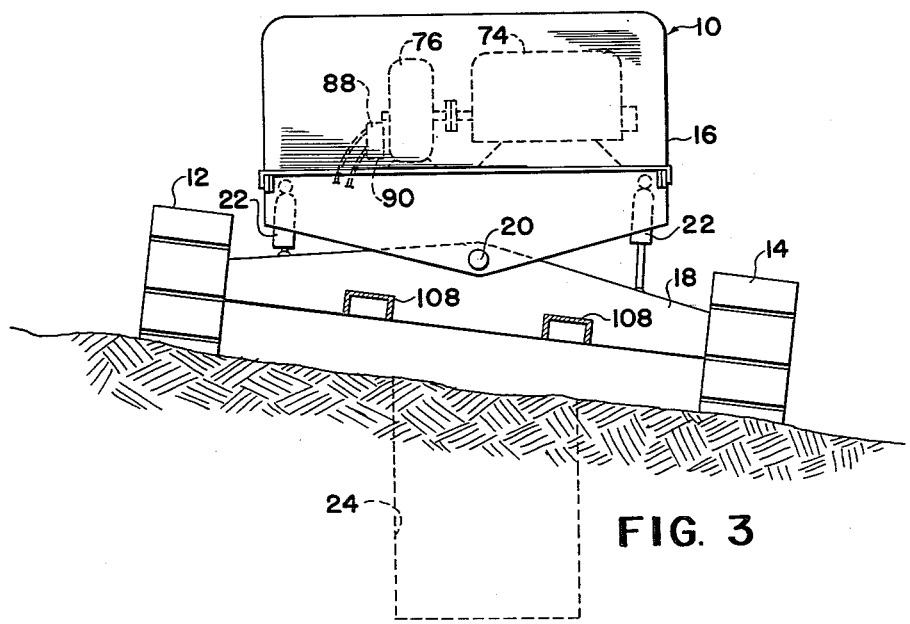
FIG. 3 is a partially schematic front elevation showing the vehicle proceeding in a hillside trenching operation.

More particularly in FIGS. 1, 2, and 3 of the drawings, a crawler type vehicle 10 is shown having oppositely disposed endless wheel tracks 12 and 14 at the respective sides thereof, and including a body 16, and a chassis frame 18 having fore and aft connections 20 to the body and being rigidly suspended between and in the horizontal plane of the wheel tracks 12 and 14.

Two hydraulic cylinders 22 (FIG. 3) disposed one at each side of the body and connecting the body with a point on the chassis frame 18 at that side are arranged so that when pressure is applied to the pistons therein, they tilt the body 16 with respect to a longitudinal axis defined by the connections 20. In this manner the body 16 can be kept level on a hillside for groundworking purposes e.g., a trenching operation so as to dig a fore-and-aft disposed vertical trench 24.

Trenching mechanism is provided at the forward end of the vehicle 10, comprising a generally longitudinally extending boom 26 and an endless series of shovels 28 which are carried on the boom 26 by articulated means so as to travel in a closed path of circulation in a fore and aft plane. The boom 26 is free at its outer end and at the inner end the boom is made fast to a power operated transverse axle 30 which rotates to produce up and down boom movement. The axle 30 is journalled in bearings in the usual manner and defines a fixed horizontal axis. A trencher dirt conveyer 32 (FIG. 1) which is driven by a hydraulic motor 34 receives dirt delivered by the upcoming shovels 28 and discharges same laterally at a point beyond the near wheel track 12.

The vehicle 10 constitutes a three purpose ground working apparatus and besides the trencher, includes a dozer blade 36 which by means of adjustable mechanism including longitudinal arms 38 is secured to the chassis frame 18 at the rear of the vehicle.

The third implement is a back hoe 40 having the vertical swing post 42 thereof secured to the body 16 at a level slightly above and located slightly rearwardly of the position of the dozer blade 36. A boom 44 has a pivot connection 46 to the lower end of the back hoe swing post 42 for relative pivotal movement on a horizontal axis with respect to the swing post 42 and the boom 44 also undergoes conjoint swinging movement in horizontal planes with the swing post 42 about its vertical axis. At the free end the boom 44 has a pivot connection 48 to a depending arm member 50 and the arm member 50 has a pivot connection 52 to a hoe bucket 54.

Power cylinders 58 and 60 under control of the operator are mounted and operated in conventional way for varying the angularity between the members 44, 50 and 50, 54 about their respective pivot joints 48, 52. A third power cylinder (not shown) is disposed behind a plate 56 and operated in a conventional manner to vary the angularity between the members 42, 44 about the pivot connection 46.

Figure 4:
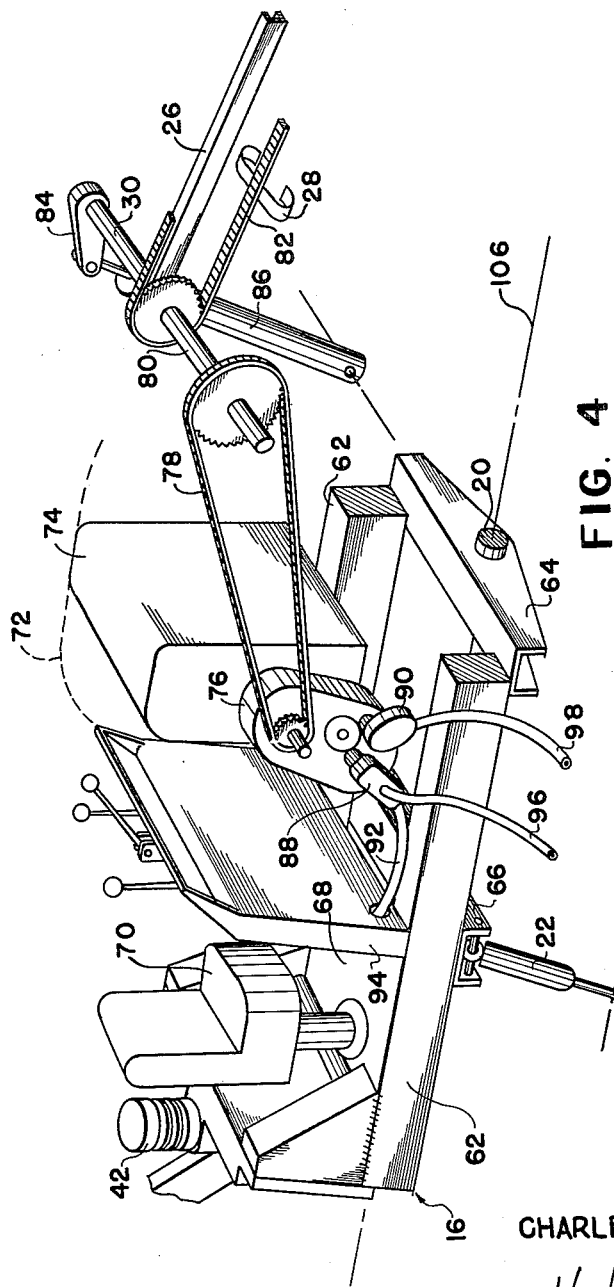
FIG. 4 is an isometric view of the vehicle body, with certain parts removed for clarity.

In FIG. 4, the body 16 of the vehicle has a sub-frame including a pair of longitudinally extending members 62 disposed one at each side and secured together by means of longitudinally spaced apart cross members 64 and 66. A platform 68 supported on the sub-frame supports an operator's seat 70 in a position to the rear of an engine compartment shown in phantom lines at 72. An engine 74 within the compartment is disposed crosswise to the sub-frame and drives a clutch and gear reduction box 76. The output side of the box 76 is connected through a chain and sprocket connection 78 and a cross shaft 80 for driving a trencher-digger chain 82 which carries the shovels 28 on the trencher boom 26. The axle 30 for controlling the angularity of the boom 26 has a lever 84 at one end which is connected to a power cylinder 86 under control of the operator so as to adjust the position of the lever 84.

The box 76 also drives a large pump 88 and a small pump 90 which draw fluid through a hose connection 92 from a reservoir 94 supported on the sub-frame. Separate outlet conduits 96 and 98 from the pumps lead to control valves under control of the operator whereby the various power operated mechanisms on the vehicle can be actuated; these valves are not shown but are located on the body 16 in convenient positions to the operator's seat 70.

Figure 5:
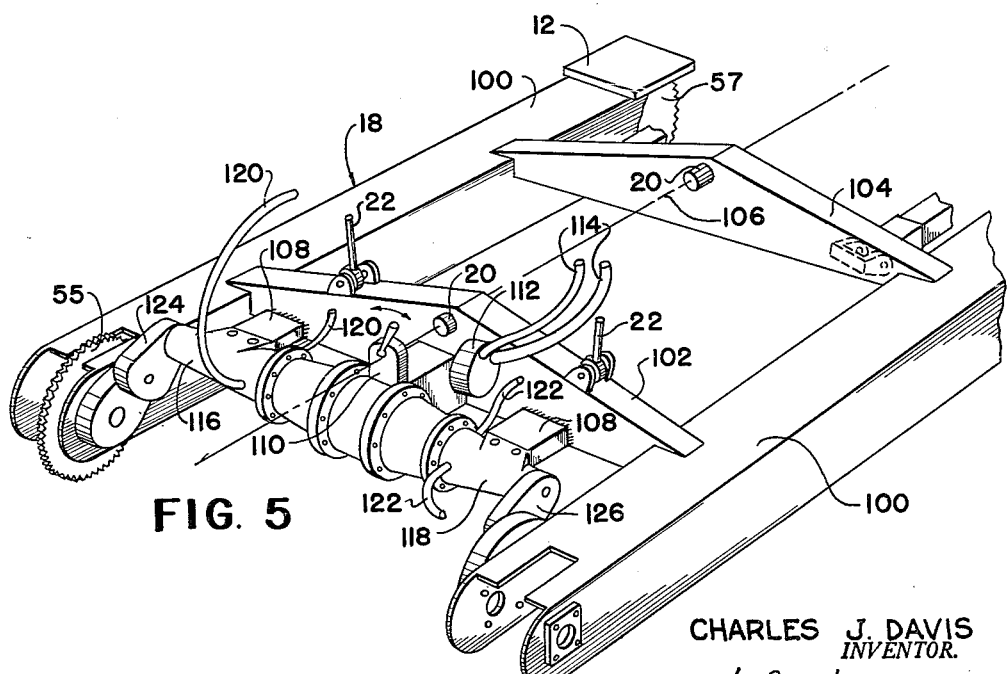
FIG. 5 is an isometric view of the chassis of the vehicle, with the parts of FIG. 2 omitted.

In FIG. 5, the crawler chassis frame 18 includes two parallel longitudinal side members 100 connected together by longitudinally spaced apart front and rear cross beams 102 and 104. The fore and aft connections 20 aforesaid consist of pivots connecting the front cross beam 102 and the body sub-frame front cross member 64 together, and connecting the rear cross beam 104 and the body sub-frame rear cross member 66 together. These pivots thus establish a common longitudinal tilt axis 106 for the body 16.

A front wheel drive mechanism is connected to the front wheels 55 within the wheel tracks 12 and 14; the rear wheels, one being indicated at 57, operate as idler wheels. A guide wheel 59 (FIGURES 1 and 2) supports the upper flight of each track at a point midway of the front and rear wheels 55 and 57.

A front mounted, transversely disposed, two-speed transmission unit has the opposite ends thereof secured by channel members 108 to the front cross-beam 102 and carries a gear shift lever 110 at a point intermediate the ends. A hydraulic traction motor 112 is connected to provide input torque to the transmission and receives motive fluid through flexible hoses 114 which extend between the body and the chassis frame and which allow relative movement therebetween. These hoses are supplied with fluid from the valves (not shown) controlling the output from the large and the small pumps of FIG. 4 preceding.

The motor 112 is reversible and is connected through gearing in the transmission to a hydraulically controlled clutch and brake unit 116 for driving the right wheel track 12 and to another combined clutch-brake unit 118 for driving the left wheel track (not shown). The hydraulic control conduits for the clutch-brake unit 116 consist of two flexible hoses 120 and the hydraulic control conduits for the clutch-brake unit 118 consists of flexible hoses 122.

The clutch and brake unit 116 drives through a tandem connected, chain reduction drive 124 to rotate the front wheel 55 and the wheel track 12 in either direction dependent upon the rotation of the traction drive motor 112. A similar tandem connected chain drive 126 is coupled by the clutch and brake 118 to the front wheel of the other wheel track (not shown). A further gear reduction is provided in the power train to the individual track wheels and each is located in a forward end of the frame members 100 but is not visible in the showing of FIG. 5.

Figure 6:
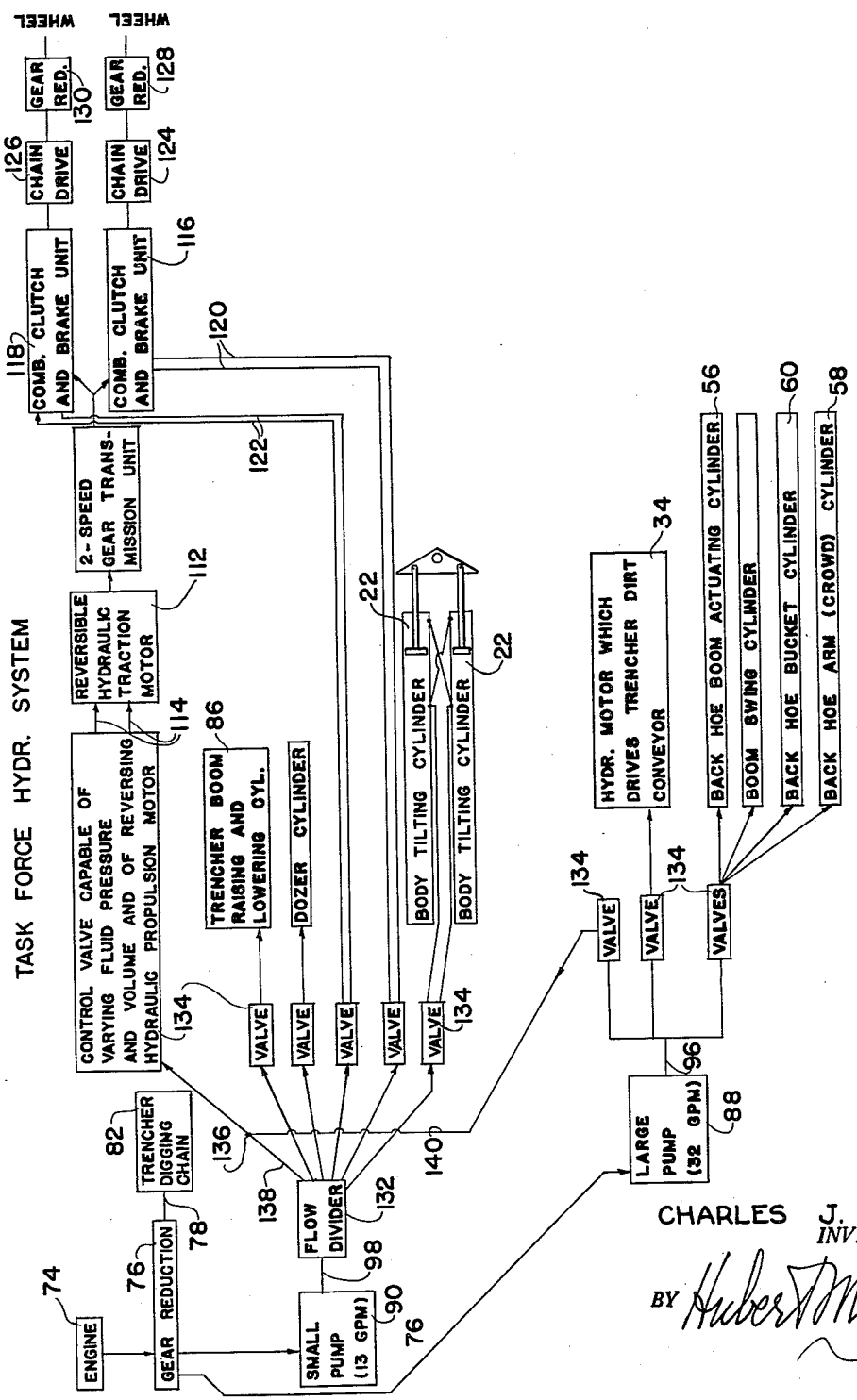
FIG. 6 is block diagram of the hydraulic system.

In FIG. 6, the gear reductions just referred to are schematically indicated at 128 and 130. A flow divider 132 and the various control valves 134 utilized are preferably mounted on the body of the vehicle within reach of the operator. The referred to flexible hoses connected between the body and the chassis frame are indicated by the same reference numerals 114, 120, and 122. The junction indicated at 136 between the conduits 138 and 140 respectively is a schematic showing intended to indicate that the large pump 88 and the small pump 90 can be compounded for mutually applying their output to the reversible traction motor 112.

In normal travel of the vehicle 10 under its own power, it proceeds in a direction from left to right as viewed in FIG. 1 and with the booms 26 and 44 carried in their inactive positions as there shown.

In a back-hoeing operation, the operator normally operates the back hoe 40 with the vehicle stationary. He ordinarily moves the vehicle only when it is necessary to take a new position.

For its bulldozer purposes, the vehicle operates in a direction from right to left as viewed in FIG. 1, the dozer blade 36 being lowered into the proper position by appropriate manipulation of the arms 38 under control of a hydraulic power mechanism (not shown).

In the trench digging operation, the vehicle 10 moves in a left to right direction as viewed in FIG. 2. In getting started, the operator sets the chain and sprocket connection 78 in motion to drive the buckets 28 (FIG. 4) and he also sets the trencher conveyor 32 in motion. The operator causes the cylinder 86 (FIG. 4) to gradually lower the trencher boom 26 so that the trencher digs itself to the desired angle beneath the ground and he thereupon starts the wheel tracks 12 and 14 rotating so as to advance the trench in the direction stated as the vehicle advances.

Generally in back-hoeing, and particularly in the trench-digging, it is desirable and in most if not all cases essential that the implement execute each path of motion in a vertical plane irrespective of the slope of the ground surface (see FIG. 3). The tilting action produced by the piston and cylinder connections 22 at opposite sides of the present apparatus enables the implements to readily accommodate to hillside operations; the flexible hose connections 114, 120 and 122 afford uninterrupted application of motive fluid for power and for control purposes in this apparatus while varying degrees of adjustments are effected in moving over the terrain in a continuous trenching operation, for example.

It is a feature of this apparatus that one hydraulic system is provided which is common to the respective implements for trenching, back-hoeing, and bulldozing; with each operation, the traction motor can simultaneously be employed for driving the wheel tracks and the clutch-brake-units are under constant hydraulic control for steering the vehicle. For normal travel, the large and small pumps can be compounded as indicated, i.e. their combined output goes to the traction motor. Ordinarily the two speed transmission is shifted into the higher gear for travel alone.

While a specific embodiment of the invention has been shown and described in detail to illustrate the application of the invention principles, it will be understood that the invention may be embodied otherwise without departing from such principles.

Having described the invention with sufficient clarity to enable those familar with this art to construct and use it, I claim:

1. Trencher mechanism including a chassis, a generally fore and aft extending boom, a trencher supported on said boom, traction mechanism on said chassis for propelling the same, a body supported on said chassis for tilting movement about a fore and aft extending horizontal axis, means on the body supporting the boom for up and down movement about a transversely extending horizontal axis, piston and cylinder means for tilting said body and boom on said chassis about said fore and aft axis, piston and cylinder means for pivoting said boom about said transversely extending horizontal axis, drive means comprising a motive fluid pump on said body, fluid controlling valves in the output of said pump, driven means comprising a traction motor on said chassis for operating said traction mechanism, and flexible supply and return hoses connected between said valves in the output of the pump and said traction motor for providing flow of said fluid uninterrupted by tilting action of said body and boom as aforesaid.

2. A self-propelled groundworking vehicle comprising: a chassis, ground-engaging propulsion means carried by the chassis at opposite sides thereof, an implement frame overlying said chassis, groundworking tool means carried by the implement frame, means pivotally interconnecting the chassis and the implement frame for relative tilting movement, extensible and retractable means interconnecting the chassis and the implement frame at spaced points for tilting the implement frame relative to the chassis in order to maintain the implement frame substantially level when the vehicle is positioned on a hillside or uneven terrain, a power plant mounted on the implement frame, drive means operatively interconnecting the power plant and the groundworking tool means, clutch-brake means mounted on the chassis and selectively connectable with the ground-engaging propulsion means at either or both sides of said chassis for propelling the vehicle in the desired direction of travel, and flexible power transmission means operatively interconnecting the power plant on the implement frame and the clutch-brake means on the chassis for transmitting power from said power plant to the clutch-brake means regardless of the tilted position of the implement frame relative to the chassis.

3. The self-propelled groundworking vehicle described in claim 2, and further comprising a second groundworking tool means mounted on and tiltable laterally with the implement frame, one of said groundworking tool means being located at each end of said implement frame.

4. The self-propelled groundworking vehicle described in claim 2 in which the flexible power transmission means includes flexible hoses and a hydraulic traction motor, one end of each hose being connected to the power plant on the implement frame and the other end of each said hose being connected to the hydraulic traction motor, said hydraulic traction motor being mounted on the chassis and operatively connected through gearing with the clutch brake means.

5. The self-propelled groundworking vehicle described in claim 2, in which the power plant includes a clutch and a gear reduction box mounted on the implement frame and in which the drive means for the groundworking tool means includes a chain and sprocket transmission means interconnecting the gear reduction box and the groundworking tool means.

6. A self-propelled groundworking vehicle with wheel tracks carried at the opposite sides thereof and comprising: a crawler chassis disposed between and rigidly supported by the wheel tracks; and implement carrying body pivotally mounted atop said chassis along a fixed axis which is longitudinally disposed with respect to the body and to the chassis; power means operably connected to the chassis and to the body for laterally tilting the body with respect to the chassis; a power plant and at least one power driven ground working implement mounted on and tiltable with the body; and means operatively interconnecting the power plant and the wheel tracks to propel said vehicle along the ground surface regardless of the laterally tilted position of the body relative to the chassis, which means includes a gear transmission unit mounted on and rigidly supported by the chassis; means for transmitting rotational power from the transmission unit independently to each of the wheel tracks; hydraulic motor means supported by the chassis and connected to drive the geared transmission unit; power-plant driven hydraulic pump means mounted on the body; and means comprising flexible pressure fluid supply and return conduits connecting the hydraulic pump and hydraulic motor means.

References Cited in the file of this patent

UNITED STATES PATENTS

| | | |
|---|---|---|
| 237,927 | Taynton et al. | Feb. 15, 1881 |
| 705,731 | Ach | July 29, 1902 |
| 1,429,474 | Wickersham | Sept. 19, 1922 |
| 2,073,823 | Anthony | Mar. 16, 1937 |
| 2,101,837 | Blanchett | Dec. 14, 1937 |
| 2,365,387 | Briscoe | Dec. 19, 1944 |
| 2,658,342 | Banister | Nov. 10, 1953 |
| 2,660,816 | Maxwell | Dec. 1, 1953 |
| 2,745,503 | Fisher | May 15, 1956 |
| 2,763,164 | Neklutin | Sept. 18, 1956 |
| 2,771,958 | Ball | Nov. 27, 1956 |
| 2,777,219 | Brant | Jan. 15, 1957 |
| 2,846,094 | Pilch | Aug. 5, 1958 |
| 2,872,200 | Kroll | Feb. 3, 1959 |
| 2,967,578 | Schomers | Jan. 10, 1961 |
| 3,024,546 | Cramer | Mar. 13, 1962 |
| 3,043,029 | Allard | July 10, 1962 |

FOREIGN PATENTS

| | | |
|---|---|---|
| 337,244 | Germany | Aug. 13, 1919 |
| 823,464 | Great Britain | Nov. 11, 1959 |
| 1,193,171 | France | Apr. 27, 1959 |